No. 608,180. Patented Aug. 2, 1898.
B. S. CONSTANT.
GRAIN FEEDER AND CONVEYER.
(Application filed May 11, 1896. Renewed Jan. 28, 1898.)
(No Model.) 2 Sheets—Sheet 1.

Witnesses:
Chas. Marion.
D. D. Deane.

Inventor:
Boston S. Constant.
By Thurman and Silvius
Attorneys.

No. 608,180. Patented Aug. 2, 1898.
B. S. CONSTANT.
GRAIN FEEDER AND CONVEYER.
(Application filed May 11, 1896. Renewed Jan. 28, 1898.)
(No Model.) 2 Sheets—Sheet 2.

Witnesses:
Chas. Marien.
D. D. Deane.

Inventor:
Boston S. Constant.
By Thurman & Silvius
Attorneys.

UNITED STATES PATENT OFFICE.

BOSTON S. CONSTANT, OF BLOOMINGTON, ILLINOIS.

GRAIN FEEDER AND CONVEYER.

SPECIFICATION forming part of Letters Patent No. 608,180, dated August 2, 1898.

Application filed May 11, 1896. Renewed January 28, 1898. Serial No. 668,351. (No model.)

*To all whom it may concern:*

Be it known that I, BOSTON S. CONSTANT, a citizen of the United States, residing at Bloomington, in the county of McLean and State of Illinois, have invented certain new and useful Improvements in Grain Feeders and Conveyers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in the details of construction and in the arrangement thereof; and it consists of an advantageous combination of mechanical elements whereby the various parts of a grain-feeder may be suitably constructed at a works and readily assembled and connected with elevators wherever desired, and will be more fully understood from the following description.

Figures 1, 2:
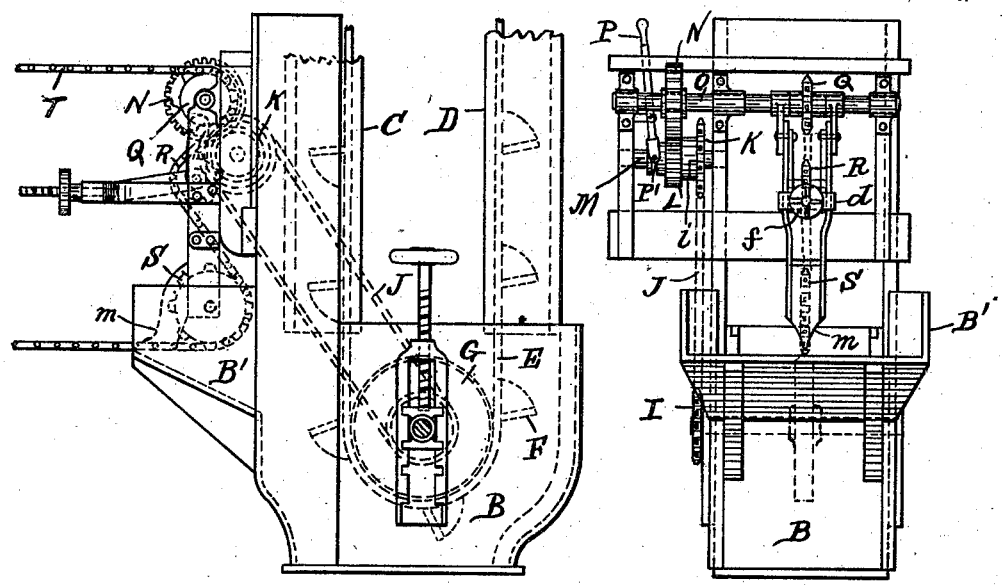
Figure 3:
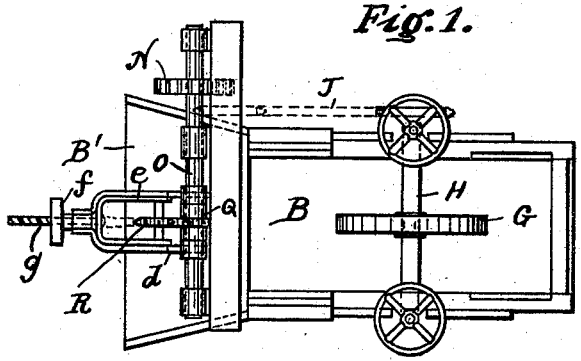
Figure 4:
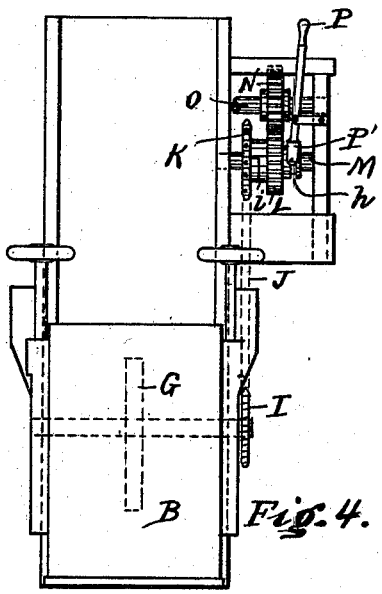
Figure 5:
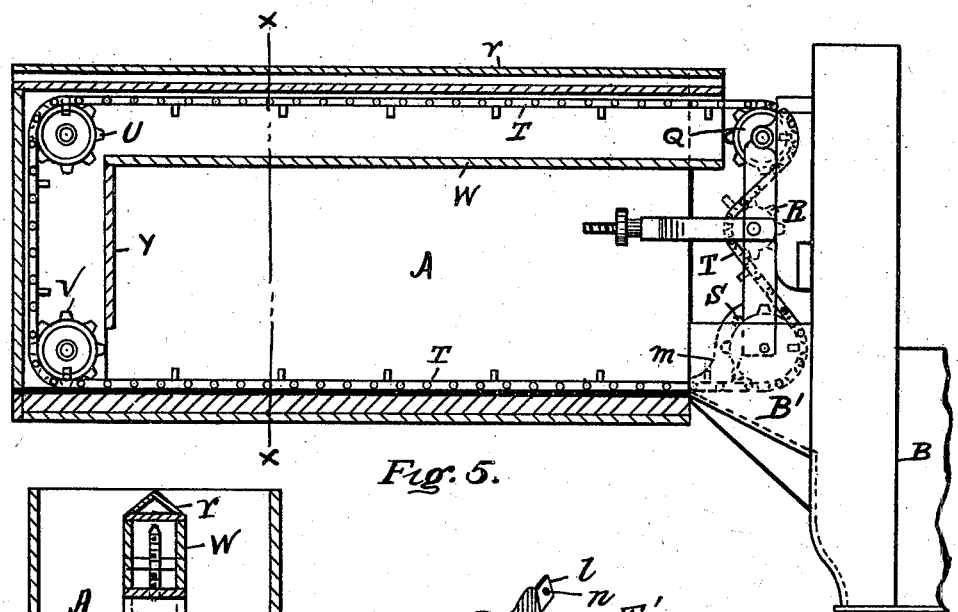
Figure 8:
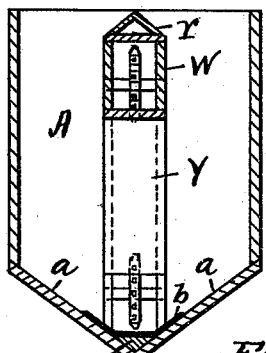
Figure 7:
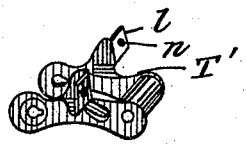
Figure 6:
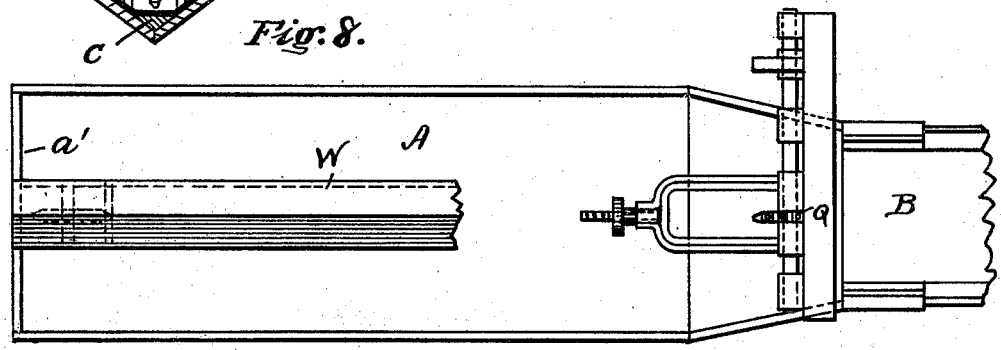

Referring to the drawings, Figure 1 represents a side elevation of an elevator-boot, showing the manner of connecting my feeder thereto. Fig. 2 is an end elevation of boot, showing means for throwing feeder out of gear. Fig. 3 is a top view of same. Fig. 4 is an elevation of the end opposite that shown in Fig. 2. Fig. 5 is a side elevation of a portion of boot with a connected feeder and bin shown in vertical section through longitudinal center. Fig. 6 is a top view of Fig. 5. Fig. 7 is a link of feeder-chain, and Fig. 8 is a transverse sectional view on the line $xx$ of Fig. 5.

In the drawings, A designates a grain-bin, which may be made of any desired length and width and has a sloping V-shaped bottom $a$. The bin is preferably made of wood and has at the center of the bottom through its length a strip $c$ of iron and at each side thereof a strip $b$ of iron. In some cases I combine the three strips in one piece, formed as shown. Upon this iron bottom or trough the carrier-chain T, composed of links T', may drag without injurious abrasion.

B is a sink or elevator-boot (similar to that illustrated in Patent No. 467,887, granted to me January 26, 1892) into which grain is carried and from which it is elevated by buckets F, carried by a belt E, running over a pulley G and through casings C and D. The belt E is preferably the driver for the carrier in the bin; but in some cases I apply the power to one of the shafts, carrying a sprocket-wheel around which the carrier-chain runs, in which case the elevator is driven by the carrier mechanism. Pulley G is mounted on a shaft H, which is revoluble in suitable adjustable journal-bearings and extends through the frame of the boxing. At one end of said shaft a sprocket-wheel I is secured thereto. Upon the front of a suitable frame rising above the sink horizontal shafts M and O are journaled.

K is a sprocket-wheel revoluble with the shaft M and is provided on one of its sides with clutch-lugs.

J is a sprocket-chain running over wheels I and K. A gear-wheel L is mounted on shaft M, revoluble thereon, and has extended hub ends, on one of which is a clutch $i$ to engage with the lugs on face of adjoining sprocket-wheel. At the opposite side of gear-wheel L its hub has an annular groove $h$, into which is fitted the fork end P' of the lever P for engaging and disengaging the clutch.

N is a gear-wheel secured to the shaft O and engaging the wheel L. A sprocket-wheel Q is secured to the shaft O in a position central with the bin A. To the frame a yoke $d$ is suitably mounted and secured and carries between its arms a smaller yoke $e$, having a threaded shank $g$, passing through a suitable opening in the crown of the yoke $d$, in which it is mounted, so that the shank is movable endwise by means of a screw-nut $f$. The yoke $e$ carries a sprocket-wheel R, suitably mounted on a shaft. Below the tightener R is a sprocket-wheel S, mounted on a short shaft suitably journaled on the frame. A metallic deflector $m$ is secured to the frame for the purpose of deflecting grain, especially ear-corn, into the chute B' and prevent its following the drag-chain around the sprocket-wheel S. At the end of the bin opposite the wheels Q and S are similar wheels U and V, suitably mounted and around which the drag-chain runs.

I construct a conduit W Y usually in detached parts, for convenience, and erect them in the bin. The horizontal conduit or chain-way W has an inverted-V-shaped top $r$ to prevent the lodgment of grain, and this, together with the sloping bottom of bin, prevents an accumulation of objectionable dust deposits. The upright chainway Y is erected against the end $a'$ of the bin. I use a drag-chain having links of the form shown in Fig. 7, which are open through the center between the ears $l$ to pass over the sprocket-teeth. I may also attach suitable buckets or slats by means of bolts or rivets passing through the holes $n$.

In practical operation the grain is dumped into the bin from above and is automatically fed from the bottom out of an aperture in the end adjacent to the conveyer or elevator into the chute B', falling by gravity into the sink or boot B, from where it is simultaneously conveyed. When desired, the feeder may be instantly stopped by a slight movement of the lever P.

Having described my invention, what I claim, and desire to secure by Letters Patent, is—

1. In a grain feeder and conveyer, the combination, with the sink or boot having the shaft mounted therein and the upright frame attached thereto, of the wheel I on said shaft; the shafts M and O mounted upon the frame; the wheel K having the clutch-lugs and secured to said shaft M; the gear-wheel L revoluble on said shaft M and having the clutch-lugs $i$ and groove $h$; the lever P mounted on the frame and engaging said groove; the gear-wheel N secured to said shaft O and engaging said wheel L; the wheel Q secured to said shaft O; the yokes $d\ e$ having the adjusting-screw $g$ and nut $f$ and mounted on said upright frame; the wheel R supported in said yoke $e$; the wheel S supported by said frame; the bin A, the wheels U and V mounted therein, and the feed-chain running therein, substantially as shown and described, for the purposes set forth.

2. In a grain feeder and conveyer, the combination with the bin and the upright frame, of the shafts mounted on said frame, the sprocket-wheel mounted on the upper one of said shafts; the sprocket-wheel mounted at the lower part of said frame, the deflector mounted to protect the front of said last-mentioned sprocket-wheel and deflect grain therefrom, the yokes and the sprocket-wheel mounted therein, substantially as shown and described.

3. In a grain feeder and conveyer, the combination of the boot or sink, the adjustable shaft mounted therein and carrying the wheel G, the sprocket-wheel I secured at the end of said shaft, the upright frame, the shafts M and O mounted on said frame, the wheel K having the clutch-lugs and secured to said shaft M, the gear-wheel L revoluble on said shaft M and having the clutch-lugs $i$ and groove $h$, the lever P mounted on said frame and adapted to control said clutch to engage and disengage it, the gear-wheel N secured to said shaft O and engaging said gear-wheel L, the sprocket-wheel Q secured to said shaft O, the bin A having the sprocket-wheels U and V mounted as shown, the sprocket-wheel S mounted above the chute B', the slack-adjuster mounted on the said frame and a suitable feeding-chain running over said sprocket-wheels, substantially as shown and described.

4. In a grain feeder and conveyer, the combination of the boot or sink, the upright frame thereon, the shafts and sprocket-wheels thereon, the bin A adjoining said boot, the V-shaped bottom provided with the iron center strip $c$ and side strips $b$, the sprocket-wheel V mounted at the inner lower end of said bin, the sprocket-wheel U mounted at the inner upper end of said bin, the chainway Y at the end of said bin, the chainway W having the sloping top $r$ supported at the top of said bin, and the feeding-chain running over said sprocket-wheels, substantially as shown and described.

In testimony whereof I affix my signature in presence of two witnesses.

BOSTON S. CONSTANT.

Witnesses:
E. T. SILVIUS,
JNO. S. THURMAN.